(12) United States Patent
Halasa et al.

(10) Patent No.: US 7,662,883 B2
(45) Date of Patent: Feb. 16, 2010

(54) RUBBERY BLOCK POLYMERS CONTAINING POLYLACTONE AND RUBBER COMPOUNDS INCLUDING THE SAME

(75) Inventors: Adel Farhan Halasa, Bath, OH (US); Abderrahim Khadir, Waterloo (CA); Wen-Liang Hsu, Cuyahoga Falls, OH (US); John Robert Zuppo, III, Copley, OH (US); Marc Weydert, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 212 days.

(21) Appl. No.: 11/617,342

(22) Filed: Dec. 28, 2006

(65) Prior Publication Data

US 2008/0161489 A1 Jul. 3, 2008

(51) Int. Cl.
C08K 3/36 (2006.01)
C08K 3/00 (2006.01)
C08L 53/02 (2006.01)
C08L 53/00 (2006.01)

(52) U.S. Cl. ............... 524/599; 525/331.9; 525/332.9; 525/333.1; 525/333.3; 525/386; 524/80; 524/492; 152/905

(58) Field of Classification Search ............... 525/191, 525/192, 231, 241, 331.9, 332.9, 333.1, 333.3, 525/386; 152/905; 524/80, 492, 599
See application file for complete search history.

(56) References Cited

U.S. PATENT DOCUMENTS

| | | | |
|---|---|---|---|
| 3,383,351 A | 5/1968 | Stamberger | |
| 3,652,720 A | 3/1972 | Wright | |
| 3,823,109 A | 7/1974 | Middlebrook | |
| 3,873,489 A | * 3/1975 | Thurn et al. | 524/262 |
| 4,000,218 A | 12/1976 | Critchfield et al. | |
| 4,242,471 A | 12/1980 | Lal | |
| 4,248,986 A | 2/1981 | Lal et al. | |
| 4,251,647 A | 2/1981 | Liu | |
| 4,346,200 A | 8/1982 | Woodbrey | |
| 4,442,265 A | * 4/1984 | Haws | 525/91 |
| 4,501,861 A | 2/1985 | Woodbrey | |
| 4,663,413 A | 5/1987 | Ward et al. | |
| 4,853,051 A | 8/1989 | Bennett et al. | |
| 4,874,818 A | 10/1989 | Yamamoto et al. | |
| 4,929,679 A | 5/1990 | Akita et al. | |
| 4,963,595 A | 10/1990 | Ward et al. | |
| 5,080,665 A | 1/1992 | Jarrett et al. | |
| 5,235,003 A | 8/1993 | Ward et al. | |
| 5,376,102 A | 12/1994 | Jarrett et al. | |
| 5,405,927 A | 4/1995 | Hsu et al. | |
| 5,747,637 A | 5/1998 | Shinoda et al. | |
| 5,834,567 A | 11/1998 | Yasuda | |
| 6,068,920 A | 5/2000 | Funae et al. | |
| 6,120,788 A | 9/2000 | Barrows | |
| 6,130,271 A | 10/2000 | Jarrett et al. | |
| 6,133,366 A | 10/2000 | Thetford et al. | |
| 6,140,453 A | 10/2000 | Barges et al. | |
| 6,322,805 B1 | 11/2001 | Kim et al. | |
| 6,365,172 B1 | 4/2002 | Barrows | |
| 6,455,613 B1 | 9/2002 | Zimmer et al. | |
| 6,486,257 B1 | 11/2002 | White et al. | |
| 6,770,717 B2 | 8/2004 | Kim et al. | |
| 6,794,462 B2 | 9/2004 | Sridharan et al. | |
| 6,835,774 B2 | 12/2004 | White et al. | |
| 7,064,171 B1 | 6/2006 | Halasa et al. | |
| 2001/0051694 A1 | 12/2001 | Barges et al. | |
| 2002/0183467 A1 | 12/2002 | Windisch et al. | |
| 2002/0188067 A1 | 12/2002 | White et al. | |
| 2002/0193518 A1 | 12/2002 | White et al. | |
| 2003/0092853 A1 | 5/2003 | Sridharan et al. | |
| 2003/0139567 A1 | 7/2003 | Kim et al. | |
| 2003/0236319 A1 | 12/2003 | Yoon et al. | |
| 2004/0217582 A1 | 11/2004 | Sridharan et al. | |
| 2006/0024357 A1 | 2/2006 | Carpenter et al. | |
| 2006/0041063 A1 | 2/2006 | Cruse et al. | |
| 2006/0100390 A1 | 5/2006 | Heise et al. | |

OTHER PUBLICATIONS

Rothon, R. Particulate-Filled Polymer Composites Rapra Technology Limited, Shawbury et al, published in 2003 pp. 303-307, 313, 314, 326-333.*
Hsieh, H. L., "Styrene-Diene-Lactone Block Copolymers," Journal of Applied Polymer Science, vol. 22, 1978, pp. 1119-1127.
Clark, et al., "Impact-Resistant Plastics from Blends of Poly(Styrene/Acrylonitrile) with e=Caprolactone Block Copolymers," Journal of Applied Polymer Science, vol. 22, 1978, pp. 1081-1092.
European Patent Office, European Search Report in EP Application No. EP07123591.5, Apr. 15, 2008, 4 pgs.

* cited by examiner

*Primary Examiner*—Irina S Zemel
*Assistant Examiner*—Jeffrey Lenihan
(74) *Attorney, Agent, or Firm*—Wood, Herron & Evans, L.L.P.

(57) ABSTRACT

The present invention is directed to rubbery block polymers containing a polylactone, such as polycaprolactone, methods of making the same, and to rubber compounds containing those block polymers. The rubbery block polymer is an anionically polymerized block polymer defined by A-B, wherein A includes at least one type of polymerized conjugated diene monomer, a polymerized vinyl aromatic monomer, or a mixture thereof and wherein B is a polylactone, such as polycaprolactone, which is hydroxy terminated. The rubbery block polymer may be compounded so to provide, for example, a tire tread with desirable properties for use in an automobile tire. Such rubber compound, for example, can include the rubbery block polymer, an organosilane coupling agent, such as a bis(trialkoxysilyl) alkane, bis(trialkoxysilylalkyl) polysulfide, or mixtures thereof, and silica filler in specified amounts.

18 Claims, No Drawings

RUBBERY BLOCK POLYMERS CONTAINING POLYLACTONE AND RUBBER COMPOUNDS INCLUDING THE SAME

FIELD OF THE INVENTION

The present invention is directed to rubbery block polymers containing a polylactone, such as polycaprolactone, methods of making the same, and to rubber compounds containing those block polymers.

BACKGROUND OF THE INVENTION

It is desirable for tires to have, for example, good wet skid resistance, low rolling resistance, tear strength, and good wear characteristics. In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers that undergo a large energy loss have generally been utilized in the tread of the tire. In order to balance these two viscoelastically inconsistent properties, mixtures of various types of synthetic and/or natural rubber are normally utilized in tire treads. For instance, various mixtures of styrene-butadiene rubber (SBR) and polybutadiene rubber are commonly used as a rubbery material for automobile tire treads. To alter or manipulate the properties of these rubbery polymers, and thus the characteristics of the tire utilizing such rubbery polymer, various compounds may be added to the terminal ends thereof.

Such end functionalized rubber polymers may define block polymers, which are comprised of blocks of different polymerized monomers. These block polymers can be synthesized using anionic addition polymerization reactions. In anionic addition polymerizations, olefinic monomers, for example, may be polymerized after initiation by a strong anionic base, such as an organolithium compound. When the organolithium compound is contacted with a molecule having a terminal C=C bond, a conjugate addition occurs between the carbanion of the organolithium compound and the terminal C=C bond. This conjugate addition forms a new carbanion centered on the monomeric moiety, which subsequently reacts with additional olefinic monomer to form a living polymerization reaction. Accordingly, the desired functional monomers may be added to the end of the living polymer.

These end functionalized rubbery block polymers may be utilized in rubber compounds, such as for tire treads. However, rubber compounds, which often include carbon black and/or silica filler, for example, must include the appropriate mix of ingredients so as to provide the resulting tire with desirable characteristics. Unfortunately, due to the unpredictable interactions of the various compounds and chemicals used for compounding these rubbery polymers, it can be challenging to formulate useful rubber compounds that provide tires with overall desirable performance characteristics.

Thus, it would be desirable to provide a rubber compound, such as for use in tire treads, that contains an end functionalized rubbery block polymer, which is hydroxy terminated, wherein such rubbery compound interacts with polar filler and can provide desirable wear properties without substantially sacrificing other performance characteristic(s), e.g., traction properties.

SUMMARY OF THE INVENTION

In accordance with an embodiment, a rubbery block polymer of the general formula A-B is provided wherein (a) the A-block includes one or more different types of polymerized conjugated diene monomers, polymerized vinyl aromatic monomers, or mixtures thereof and (b) the B-block includes a polymerized lactone monomer, or cyclic ester monomer, such as $\epsilon$-caprolactone and butyrolactone, of 5 units to 100 units. The B-block thus defines a polylactone, such polylactone being hydroxy terminated.

The rubbery block polymer is an anionically polymerized block copolymer. To that end, a catalyst system is responsible for the polymerization thereof. Such catalyst system includes a polymerization initiator, i.e., an organolithium compound, and optionally one or more modifiers, for example, a diamine compound, a salt of a benzene sulfonic acid, or mixtures thereof.

The rubbery block polymer can be compounded so to provide, for example, a tire tread for use in an automobile tire which has desirable properties. Such rubber compound, for example, can include the rubbery block polymer, an organosilane coupling agent, such as a bis(trialkoxysilyl)alkane, bis (trialkoxysilylalkyl) polysulfide, or mixtures thereof, and silica filler in specified amounts.

DETAILED DESCRIPTION

A rubbery block polymer of the general formula A-B is provided wherein (a) the A-block includes one or more different types of polymerized conjugated diene monomers, polymerized vinyl aromatic monomers, or mixtures thereof and (b) the B-block includes a polymerized lactone monomer, or cyclic ester monomer, of 5 units to 100 units wherein the cyclic ester rings are opened upon polymerization for forming repeating polyester units, with the last or terminal unit being hydroxy terminated.

The conjugated diene monomer can be selected from the formula $R^1R^2C=CR^5-CR^6=CR^3R^4$, wherein $R^1$, $R^2$, $R^3$, and $R^4$ are independently selected from the group consisting of hydrogen and $C_1$-$C_{15}$ alkyl groups, and $R^5$ and $R^6$ are independently selected from a $C_1$-$C_{15}$ alkyl group or hydrogen. The $C_1$-$C_{15}$ alkyl groups may be straight chain or branched alkyl groups. Examples of the conjugated diene monomers include, but are not limited to, 1,3-butadiene ("butadiene"), 1,3-pentadiene, 2,4-hexadiene, 1,3-hexadiene, 1,3 heptadiene, 1,3-octadiene, 4,5-diethyl-1,3-octadiene, piperylene, isoprene, 2,3-dimethyl-1,3-butadiene, 2,3-diethyl-1,3-butadiene, 2,3-di-n-propyl-1,3-butadiene, 2-methyl-3-isopropyl-1,3-butadiene, 2-methyl-3-ethyl-1,3-butadiene, 2-phenyl-1,3-butadiene, 3-methyl-1,3-pentadiene, 2-ethyl-1,3-butadiene, 2-methyl-1,3-hexadiene, 3-methyl-1,3-heptadiene, 3-butyl-1,3-octadiene, and 3-n-propyl-1,3-pentadiene.

Examples of the vinyl aromatic monomers include, but are not limited to, monovinyl, divinyl, and trivinyl benzene monomers such as styrene, α-methylstyrene, p-tertiary-butyl styrene, methyl vinyl toluene, p-vinyl toluene, $C_1$-$C_{12}$ alkyl substituted styrenes, aryl substituted styrenes, and halogen substituted styrenes.

In one embodiment, the A-block may be a homopolymer formed by the polymerization of a conjugated diene monomer, e.g. butadiene. In another embodiment, the A-block may be a copolymer formed by the copolymerization of two different types of conjugated diene monomers, such as isoprene and butadiene, to provide, for example, isoprene-butadiene rubber (IBR). In yet another embodiment, the A-block may be a copolymer formed by the copolymerization of a conjugated diene monomer and a vinyl aromatic monomer, such as styrene and butadiene, to provide, for example, sytrene-butadiene rubber (SBR). Terpolymers are also contemplated.

The molar ratio between two different monomers in the A-block may be any desired ratio. In one embodiment, that copolymer may generally define a random mixture of the monomers wherein the term "random" as used herein means that less than 10 percent of the total quantity of repeat units derived from a conjugate diene monomer or vinyl aromatic monomer are in blocks containing more than five repeat units. In other words, more than 90 percent of the repeat units are in blocks containing five or fewer repeat units. In addition, the A block copolymers also tend to have a consistent composition throughout their polymer chains. In other words, the content of a specific monomer of the polymer will be about the same from the beginning to the end of the polymer chain. For example, no segments of at least 100 repeat units within the polymer will have a styrene content which differs from the total styrene content of the polymer by more than about 10 percent.

In another embodiment, the copolymer of the A-block may generally define a non-random rubbery polymer as described in U.S. Pat. No. 7,064,171, which is expressly incorporated by reference herein in its entirety. In addition, the A-block may further include, for example, polymerized butadiene monomer defining a rubbery polymer having a low or high vinyl content and/or a low or high glass transition temperature, as those terms are understood in the art.

The A-block copolymers, which include conjugated diene monomers and vinyl aromatic monomers, will typically contain from about 2 weight percent to about 50 weight percent vinyl aromatic monomer, e.g., styrene, and from about 50 weight percent to about 98 weight percent conjugated diene monomers, e.g., 1,3-butadiene. However, in some cases, the amount of, for example, styrene included will be as low as about 1 weight percent. In another example, the A-block copolymer rubbers, e.g., styrene-butadiene rubber, will contain from about 3 weight percent to about 30 weight percent styrene and from about 70 weight percent to about 97 weight percent 1,3-butadiene. In another example, the A-block copolymer rubbers, e.g., styrene-butadiene rubber, will contain from about 3 weight percent to about 25 weight percent styrene and from about 75 weight percent to about 97 weight percent 1,3-butadiene.

The lactone monomers used to form the B-block may be cyclic esters in which the ring structure includes a 4- to a 12-membered ring containing from three to eleven carbon atoms and containing one oxygen atom adjacent to a carbonyl group. In one embodiment, the lactone is a C4, C6, or C12 lactone. Examples of suitable lactones include, but are not limited to, β-propiolactone, butyrolactone, such as β-butyrolactone or γ-butyrolactone, δ-valerolactone, and ε-caprolactone. In another embodiment, the lactone is ε-caprolactone, which is stable towards depolymerization at temperatures above 100° C. The polylactone can include any desired number of units on the terminal end of the rubbery block copolymer, with the last or terminal unit being hydroxy terminated. In one embodiment, the desired number of monomer units is from about 5 units to about 100 units. The polylactone defines about 1% to about 5% of the rubbery block copolymer. In another embodiment, the polylactone defines about 1% to about 2% of the rubbery block polymer.

Block polymers produced according to this invention can be of any molecular weight depending on the intended application. Generally, for purposes of making tire products, the molecular weight of the rubbery block polymers fall within the range from about 50,000 to about 1,000,000. In another example, the molecular weight of the rubbery block polymers is from about 80,000 to about 500,000.

A catalyst system for the polymerization of the A-B block polymer includes a polymerization initiator, i.e., an organolithium compound, and optionally one or more modifiers, for example, a diamine compound, a salt of a benzene sulfonic acid, or mixtures thereof. The method for synthesizing such A-B block polymers generally includes anionic addition polymerization of the A-block monomers in the presence of the catalyst system, with the resulting A-block being subsequently contacted with a cyclic ester to attach the ester moiety thereto. The attached ester moiety then is contacted with additional cyclic esters in a number of polymerization cycles to produce the B-block polyester having hydroxy terminated chain ends.

The organolithium compounds of the catalyst system can include the monofunctional and multifunctional initiator types known for polymerizing the conjugated diolefin monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the activity of the organolithium compound, thereby necessitating the presence of sufficient lithium functionality so as to override such effects.

The multifunctional organolithium compounds which can be used include those prepared by reacting an organomonolithium compounded with a multivinylphosphine or with a multivinylsilane, such a reaction typically being conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine generally should be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium, and others known to those having ordinary skill in the art.

The multivinylsilane compounds can include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and others known to those having ordinary skill in the art.

The multivinylphosphine compounds can include trivinylphosphine, methyldivinylphosphine, dodecyldivinylphosphine, phenyldivinylphosphine, cyclooctyldivinylphosphine, and others known to those having ordinary skill in the art.

Other multifunctional polymerization initiators can be prepared by utilizing an organomonolithium compound further in combination with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, may be in the range of about 2 to 15 moles of polymerizable compound per mole of organolithium compound. The amount of multivinylaromatic compound employed, in one example, may be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Alternatively, specific organolithium compounds can be used as initiators, if desired, in the preparation of the rubbery polymers. These can be represented by $R(Li)_x$ wherein R represents a hydrocarbyl radical containing from 1 to 20 carbon atoms, and wherein x is an integer of 1 to 4. The organolithium compounds can include methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound. For instance, the initiator can be an alkylsilyloxy protected functional lithium initiator of the structural formula:

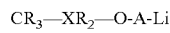

$CR_3$—$XR_2$—O-A-Li wherein X represents a group IVa element selected from carbon, germanium, or tin; wherein R represents alkyl groups that can be the same or different and that contain from 1 to about 8 carbon atoms; and wherein A represents an alkylene group; or:

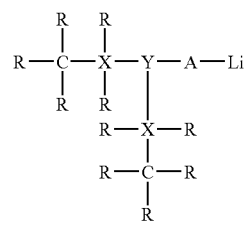

wherein X represents a group IVa element selected from carbon, germanium, or tin; wherein Y represents oxygen, phosphorous, or nitrogen; wherein R represents alkyl groups that can be the same or different and that contain from 1 to about 8 carbon atoms; and wherein A represents an alkylene group; or (c):

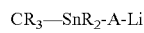

$CR_3$—$SnR_2$-A-Li wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —$(CH_2)_n$— or it can represent a branched alkylene group, such as:

—[—$CH_2$—$CR_2$—$CH_2$—]— wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

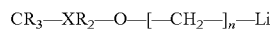

$CR_3$—$XR_2$—O—[—$CH_2$—]$_n$—Li wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

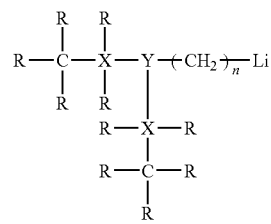

wherein X represents a group IVa element selected from carbon, silicon, germanium, or tin; wherein Y represents oxygen, phosphorous, or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

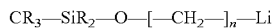

wherein n represents an integer from 1 to 10, and wherein R represents alkyl groups that can be the same or different and that contain from 1 to about 8 carbon atoms.

The organolithium compound will normally be present in the polymerization medium in an amount that is within the range of about 0.01 to about 1.5 phm (parts by 100 parts by weight of total monomer).

The catalyst system may also further optionally include one or more modifiers, such as a diamine compound, a salt of a benzene sulfonic acid, or mixture thereof. These modifiers generally help control the microstructure of conjugated diene polymers and/or the compositional distribution, i.e., randomization, of monomer units in the A block.

The diamine compound may be an aliphatic diamine or a bicyclic chelating diamine compound. The bicyclic chelating diamine compounds generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic diamines can include primary, secondary, or tertiary amines, or combinations thereof. In one example, the aliphatic diamine is an aliphatic bis-primary diamine, such as ethylene diamine or 1,3-diaminopropane. In yet another embodiment, the aliphatic diamines is an aliphatic bis-tertiary diamine, such as N,N,N',N'-tetramethylethylene diamine ("TMEDA").

The salt compounds of the benzene sulfonic acids can include salts of lithium, sodium, potassium, magnesium, calcium, and barium. The salt of benzene sulfonic acid further includes a benzene ring structure having at least one sulfonate group bonded to the aromatic ring. The benzene ring may further comprise at least one $C_1$-$C_{15}$ branched or straight chain alkyl substituent in the ortho-, meta-, or para-position relative to the sulfonate group. In one example, the alkyl benzene sulfonate is a linear alkyl benzene sulfonate wherein the at least one $C_1$-$C_{15}$ alkyl group is straight chained and is bonded to the benzene ring in a position para- to the sulfonate group. The benzene ring may further comprise at least one methyl group in addition to the at least one $C_1$-$C_{15}$ alkyl substituent.

The $C_1$-$C_{15}$ alkyl substituent may be attached to the benzene ring by means of a conventional Friedel-Crafts alkylation process using a corresponding olefin and employing a Lewis acid catalyst, such as aluminum chloride, and conditions known to those skilled in the art as useful for such alkylations. Once the alkyl substituent has been appended to the benzene ring in accordance with the foregoing, the resulting alkylbenzene may subsequently be sulfonated in order to produce the desired benzene sulfonic acid, which may be deprotonated to form the alkylbenzene sulfonate salt. Sulfonation is a known chemical process whose reactants and conditions are known to those skilled in the chemical arts. Through the process of sulfonation, a sulfonate group is chemically bonded to a carbon atom in the benzene ring structure of the alkylbenzene, thus providing the molecule with a hydrophilic sulfonate group in addition to the hydrophobic alkyl group. The hydrophobic alkyl appendage of the benzene ring may be further substituted at any carbon position with at least one sulfonate group thereby forming an at least secondary sulfonate compound.

Examples of salts of benzene sulfonic acid include, but are not limited to, lithium dodecylbenzene sulfonate, sodium dodecylbenzene sulfonate, potassium dodecylbenzene sulfonate, magnesium dodecylbenzene sulfonate, calcium dodecylbenzene sulfonate, barium dodecylbenzene sulfonate, lithium dodecyltoluene sulfonate, sodium dodecyltoluene sulfonate, potassium dodecyltoluene sulfonate, magnesium dodecyltoluene sulfonate, calcium dodecyltoluene sulfonate, and barium dodecyltoluene sulfonate. In one embodiment, the salt of the benzene sulfonic acid is sodium dodecylbenzene sulfonate.

The diamine compound will normally be present in the polymerization medium in an amount within the range of about 0.20 to about 8.00 phm (parts by 100 parts by weight of total monomer). The benzene sulfonate salt compound will normally be present in the polymerization medium in an amount within the range of about 0.2 to about 2.0 phm.

In the catalyst system, the molar ratio of the organolithium compound to the diamine compound may be from about 0.1:1 to about 4:1. In another example, the molar ratio of the organolithium compound to the diamine compound may be from about 1:1 to about 3:1. In yet another example, the molar ratio of the organolithium compound to the diamine compound may be about 2:1. The molar ratio of the organolithium compound to the benzene sulfonate salt may be within the range of about 0.1:1 to about 4:1. In another example, the molar ratio of the organolithium compound to the benzene sulfonate salt may be within the range of about 0.25:1 to about 1:1. In yet another example, the molar ratio of the organolithium compound to the benzene sulfonate salt may be within the range of about 0.4:1 to about 0.6:1.

The catalyst system synthesizes the A-B block polymers to provide, for example, polybutadiene-polycaprolactone block polymer, IBR-polycaprolactone block polymer, and SBR-polycaprolactone block polymer, can be further compounded and utilized in tire tread rubbers. To that end, the preparation of the rubbery block polymers can be accomplished by sequential polymerization of first the A block then the B block cyclic ester monomers. The polymerizations are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, if used for forming a copolymer A block, there typically will be from about 5 to about 30 weight percent vinyl aromatic monomers in the polymerization medium. Such polymerization media is comprised of the organic solvent and monomers. In another example, if the copolymer A block includes isoprene and another conjugated diene monomer, e.g., butadiene, there typically will be from about 5 to about 30 weight percent isoprene monomers in the polymerization medium.

The polymerizations that produce the A-block copolymer of the present invention are initiated by adding the catalyst system, which includes the organolithium compound and optional modifiers, such as the diamine, the salt of the benzene sulfonic acid, or a mixture thereof, to a polymerization medium, or premix, containing the premixed monomers to be polymerized. The catalyst system may be added to the premix in any desired amount. In one example, the catalyst system is provided in an amount of about 0.100 mmol to about 0.900 mmol/per 100 parts by weight of total monomer. In another example, the catalyst system is provided in an amount of about 0.200 mmol to about 0.700 mmol/per 100 parts by weight of total monomer. The polymerizations can be carried out utilizing batch, semi-continuous or continuous techniques, as known to those having ordinary skill in the art.

The polymerization of the conjugated diene monomers, the vinyl aromatic monomers, or mixtures thereof, which define the A-block, is conducted for a length of time sufficient to permit substantially complete polymerization of the monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction.

Upon complete polymerization of the A-block monomers, the polymerization of the B-block portion of this invention is initiated by adding a desired amount of the cyclic ester to the polymerization medium containing the polymerized A-block monomers. In one embodiment, the cyclic ester is $\epsilon$-caprolactone. In one example, the caprolactone may be provided in an amount of about 3 parts to about 25 parts/per 100 parts by weight of total A-block monomers. In another example, the caprolactone may be provided in an amount of about 5 parts to about 15 parts/per 100 parts by weight of total A-block monomers.

Polymerization of the cyclic ester is effected by the anionic initiator, i.e., the organolithium compound. Upon contacting the cyclic ester with the polymerization medium containing the A-block, the lithiated end groups thereof react with the ester functionality to cleave the acyl oxygen linkage by a second-order displacement on the carbonyl carbon of the cyclic ester. This opens the ester ring, links the A-block to the ester moiety, and forms a linear hydrocarbon chain with an alkoxide end group. This alkoxide end group serves as a subsequent anionic initiator for further ring-opening polymerizations of additional cyclic ester monomers, thereby forming the linear B-block polyester, which is hydroxy terminated. Although the present invention describes directly contacting the lithiated end groups of the A-block with the cyclic esters, one of ordinary skill in the art would appreciate that the lithiated end groups of the A-block could be converted to an alkoxide group by reaction with any desired epoxide, or the like, wherein the alkoxide formed could then be directly contacted with the cyclic ester to induce polymerization of the B-block polyester. The polymerization of the B-block cyclic esters is conducted for a length of time sufficient to permit substantially complete polymerization of the cyclic ester monomers.

After polymerization has been completed, the A-B block polymer may be recovered from the organic solvent. The A-B block polymer can be recovered from the organic solvent and residue by means such as decantation, filtration, centrifugation, and others known to those having ordinary skill in the art. It can be desirable to precipitate the block polymer from the organic solvent by the addition of lower alcohols containing from about 1 to about 4 carbon atoms to the polymer solution. Suitable lower alcohols for precipitation of the segmented block polymer from the polymer cement include methanol, ethanol, isopropyl alcohol, normal-propyl alcohol, and t-butyl alcohol. The utilization of lower alcohols to precipitate the rubber from the polymer cement also terminates the living polymer by inactivating lithium end groups. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

Non-limiting examples of the A-B block polymers and methods for preparing such block polymers in accordance with the description are now discussed below. These examples are merely for the purpose of illustration of the formation of hydrocarbon rubber that is hydroxyl terminated by the use of $\epsilon$-caprolactone and are not to be regarded as limiting the scope of the invention or the manner in which it can be practiced. Other examples will be appreciated by a person having ordinary skill in the art. Unless specifically indicated otherwise, parts and percentages are given by weight.

EXAMPLE 1

2000 g of a hexane solution containing a styrene/butadiene mixture in the relative amounts described in Table 1 was charged to a one gallon stainless steel reactor with an air-driven motor, a nitrogen inlet for providing an inert nitrogen atmosphere, and internal heating/cooling coils for temperature regulation. The catalyst system, which contained 2 parts of n-butyllithium and 1 part of TMEDA, was added to the hexane solution in a ratio of 0.30 mmol of catalyst per 100 g of the monomer mixture to achieve the desired molecular weight. The reactor was heated to about 90° C. to commence the polymerization of the styrene-butadiene copolymer. The styrene-butadiene polymerization reaction was monitored using gas chromatography ("GC") to detect for the presence of unreacted monomers.

Upon complete polymerization of the styrene and butadiene monomers, 200 mL of a hexane solution containing freshly distilled caprolactone, in the amount as listed in Table 1, was added to the reaction vessel to commence polymerization of the caprolactone monomers. The caprolactone polymerization reaction was also monitored by GC to detect for the presence of unreacted caprolactone. The polymerization reaction was quenched after about 98% of the caprolactone monomers were polymerized. The block polymer was recovered and fully characterized using, for example, differential scanning calorimetry (DSC) and NMR. NMR analysis of the block polymers showed a strong absorption at 4 ppm strongly suggesting a hydroxy terminated polymer.

TABLE 1

| Sample | % Styrene | % Butadiene | % Caprolactone | $T_m$ (° C.) | $T_g$ (° C.) |
|--------|-----------|-------------|----------------|--------------|--------------|
| IA | 10 | 90 | 5 | 50 | −25 |
| IB | 20 | 80 | 10 | 51 | −30 |
| IC | 30 | 70 | 20 | 50 | −20 |
| ID | 0 | 100 | 10 | 52 | −40 |

EXAMPLE 2

The procedure described in Example 1 was utilized in this example except that the n-butyllithium to TMEDA ratio was reduced to 0.5:1, with the same relative amounts of styrene, butadiene, and caprolactone monomers listed in Table 2 being maintained. NMR analysis of the block polymers showed a strong absorption at 5 ppm strongly suggesting a hydroxy terminated polymer.

TABLE 2

| Sample | % Styrene | % Butadiene | % Caprolactone | $T_m$ (° C.) | $T_g$ (° C.) |
|---|---|---|---|---|---|
| IIA | 10 | 90 | 10 | 53 | −70 |
| IIB | 20 | 80 | 15 | 51 | −65 |
| IIC | 30 | 70 | 20 | 55 | −55 |
| IID | 0 | 100 | 20 | 50 | −80 |

EXAMPLE 3

The procedure described in Example 1 was utilized in this example except that the catalyst system contained sodium dodecylbenzene sulfonate ("SDBS") as a randomizer for the styrene-butadiene copolymer, with an n-butyllithium to SDBS ratio of 0.4:1. Additionally, the relative amounts of styrene, butadiene, and caprolactone monomers as listed in Table 3 were used. NMR analysis of the block polymers showed a strong absorption at 4 ppm strongly suggesting a hydroxy terminated polymer

TABLE 3

| Sample | % Styrene | % Butadiene | % Caprolactone | $T_m$ (° C.) | $T_g$ (° C.) |
|---|---|---|---|---|---|
| IIIA | 10 | 90 | 5 | 51 | −80 |
| IIIB | 20 | 80 | 10 | 50 | −75 |
| IIIC | 30 | 70 | 20 | 55 | −63 |

EXAMPLE 4

The procedure described in Example 3 was utilized in this example except that the catalyst system contained 2.0 mL of TMEDA wherein the n-butyllithium:TMEDA:SDBS ratio was 0.4:0.4:1. The TMEDA was added in its amount so as to increase the vinyl content and the glass transition temperatures of the rubbery polymers. The relative amounts of styrene, butadiene, and caprolactone monomers listed in Table 4 were used.

TABLE 4

| Sample | % Styrene | % Butadiene | % Caprolactone | $T_m$ (° C.) | $T_g$ (° C.) |
|---|---|---|---|---|---|
| IVA | 0 | 100 | 19.3 | 53 | −40 |
| IVB | 0 | 100 | 16.0 | 52 | −40 |
| IVC | 10 | 90 | 12.0 | 51 | −25 |

EXAMPLE 5

The procedure in Example 4 was utilized in this example except that isoprene monomers were used rather than styrene monomers in the relative amounts listed in Table 5.

TABLE 5

| Sample | % Butadiene | % Isoprene | % Caprolactone | $T_m$ (° C.) | $T_g$ (° C.) |
|---|---|---|---|---|---|
| VA | 75 | 25 | 6.0 | 45 | −45 |
| VB | 70 | 30 | 20.0 | 48 | −55 |

Accordingly, the data show that the catalyst system utilized for the formation of the block polymers appears to have had little effect on the melting temperature ($T_m$) of the block polymers. The melting temperature of a polymer is the temperature above which the polymer loses its crystalline structure. Of interest, the SBR-polycaprolactone block polymers had melting temperatures between 50° C. and 55° C. The IBR-polycaprolactone block polymers had a melting temperature between 45° C. and 48° C., which was slightly less than the SBR-polycaprolactone block polymers. Furthermore, the NMR analysis strongly support that the synthesized rubbery block polymers are hydroxy terminated.

The catalyst system appeared to have an effect on the glass transition temperature ($T_g$) of the polymers. The glass transition temperature of a polymer is the temperature below which the polymer becomes rigid and brittle and can crack or shatter under stress. A comparison of Table 1 with Table 2 shows that the glass transition temperature of the SBR-polycaprolactone block polymer decreased upon decreasing the ratio of n-butyllithium to TMEDA in the catalyst system. For example, in catalyst systems employing an n-butyllithium to TMEDA ratio of 2, the glass transition temperature of the block polymers ranged from −40° C. to −20° C. However, when the n-butyllithium to TMEDA ratio was lowered to 0.5, the glass transition temperature of the block polymers ranged from −80° C. to −55° C.

Table 3 indicates that replacing TMEDA with SDBS results in a further decrease of about 10° C. in the glass transition temperature of the block copolymers. For example, the glass transition temperature of sample IIIA was −80° C. while the glass transition temperature of sample IIA was −70° C., the glass transition temperature of sample IIIB was −75° C. while the glass transition temperature of sample IIB was −65° C., and the glass transition temperature of sample IIIC was −63° C. while the glass transition temperature of sample IIC was −55° C.

Table 4 indicates that addition of TMEDA to the catalyst system containing n-butyllithium and SDBS increases the glass transition temperature of the block polymers. For example, the glass transition temperature of the block polymers produced under the conditions of Example 4 range from −40° C. to −25° C., which is substantially higher than the glass transition temperature of the block polymers produced under the conditions of Example 3.

In addition, the block polymers produced in Examples 4 and 5 also had a relatively higher vinyl content of about 70% to about 80% as compared to those rubbery block polymers in Example 3, which had vinyl contents of about 10% to about 12%.

The polybutadiene-polycaprolactone, SBR-polycaprolactone, and IBR-polycaprolactone block polymers synthesized by solution polymerization using the above catalyst systems produced rubber generally show desirable glass transition and melting temperatures. The glass transition temperatures from the above examples indicate that the described catalyst systems produce rubbers having low temperature properties. These low temperature properties yield rubber compounds, for example, with good wearing properties suitable for use in tires.

In addition, these rubbery block polymers can be blended, for example, with natural rubber and/or synthetic rubbers to make tread compounds for passenger tires that may exhibit desirable rolling resistance, traction, tear, tread wear, and impact strength characteristics. The rubbery block polymer may be further compounded with additional ingredients to provide a rubber compound, such as for use in a tire tread for a tire, which may have those desirable characteristics. Specifically selected additives may be provided in the rubber compound, such as, for example, fillers including silica and optionally carbon black, as well as organosilane coupling agents. Other additives may be added as desired or as necessary including curing aids such as sulfur, activators, retarders and accelerators, rubber processing oils, resins including tackifying resins, plasticizers, fatty acid, zinc oxide, waxes, antidegradant, antiozonants, and peptizing agents. These other additives, depending on the intended use of the rubber compound, are selected and used in conventional amounts.

When compounding or further processing the rubbery block polymers into a rubber compound, the organosilane coupling agent(s) is to be mixed for reaction therewith in a range of from about 1 phr to about 20 phr of silane coupling agent. Larger quantities tend to result in insufficient coupling with the filler material. In another embodiment, from about 1 phr to about 12 phr are used. In yet another embodiment, from about 5 phr to about 10 phr. The organosilane coupling agent can include a bis(trialkoxysilyl) alkane, bis(trialkoxysilylalkyl) polysulfide, such as a di- or tetrasulfide, or mixtures thereof. The alkane of the bis(trialkoxysilyl) alkanes can include a C1 to C20 alkane. Examples of bis(trialkoxysilyl) alkanes include, for example, bis(triethoxysilyl) ethane, bis(triethoxysilyl) propane, bis(trimethoxysilyl) alkane, or bis(trimethoxysilyl) propane. In one embodiment, the silane coupling agent is bis-3-(triethoxysilyl) ethane. Examples of bis(trialkoxysilylalkyl) polysulfides include bis-3-(triethoxysilylpropyl) disulfide ("TESPD"), bis-3-(triethoxysilylpropyl) tetrasulfide ("TESPT"), bis(2-triethoxysilylethyl) tetrasulfide, bis(3-trimethoxysilylpropyl) tetrasulfide, bis(2-triethoxysilylethyl) tetrasulfide. In one embodiment, the silane coupling agent is bis-3-(triethoxysilylpropyl) disulfide or bis-3-(triethoxysilylpropyl) tetrasulfide, which can include cyclic and bridge dialkoxy silanes as described in U.S. patent application Publication No. 2006/0041063, the contents of which is incorporated by reference herein in its entirety.

When silica alone or a combination of carbon black and silica is used as the filler in the rubber compound, such compound including the rubbery block polymer (e.g., polybutadiene-polycaprolactone), the organosilane coupling agent may be included in an amount of about 3% by weight to about 20% by weight based on the weight of the silica. When the amount of the organosilane coupling agent is less than about 3% by weight, the effect of the organosilane coupling agent may not be exhibited. When the amount of the organosilane coupling agent is more than 20% by weight, the effect may not be exhibited to the degree expected from the used amount while the cost is increased. In one embodiment, the filler may be present in an amount of from about 10 phr to about 170 phr. In another embodiment, the filler may be present in an amount of from about 30 to about 150 phr. In yet another embodiment, from about 50 phr to about 150 phr.

The silica filler can include pyrogenic and precipitated siliceous pigments. The siliceous pigments include precipitated silicas such as, for example, those obtained by the acidification of a soluble silicate, e.g., sodium silicate. In one embodiment, the silica may have an average particle size that is within the range of about 4 nm to about 120 nm. In another embodiment, the silica can have a particle size that is within the range of about 7 nm to about 60 nm. Such silicas might be characterized, for example, by having a BET surface area, as measured using nitrogen gas, in the range of about 40 square meters per gram to about 600 square meters per gram. In another example, in a range of about 50 square meters per gram to about 300 square meters per gram. The BET method of measuring surface area is described in the Journal of the American Chemical Society, Volume 60, page 304 (1930).

The inclusion of the organosilane coupling agent is intended to improve the cold flow characteristics of the rubber compound and rolling resistance of tire components, such as tire treads, made therefrom. It also is intended to lead to better processability and other beneficial properties, such as a desirable Mooney viscosity. In general terms, as understood by one having ordinary skill in the art, the organosilane coupling agent allows for better interactions of the rubbery polymer with the silica filler, which provides a more desirable rubber compound. More specifically, the alkoxy group of the organosilane coupling agent hydrolyzes in the presence of moisture typically found on the surface of silica to form the corresponding silanol which reacts with or condenses in the presence of the silica surface to bond the silicon atom to the silica surface. The organic groups of the organosilane coupling agent likewise attached to the silicon atom are thus available for and can chemically react with the rubbery block polymer. As a result, the rubber block polymer can become chemically bonded by means of the coupling agent to the silica surface, such as during curing or vulcanization.

The rubber compound, which includes, for example, the rubbery block polymer, silica, and the organosilane coupling agent, is compounded by methods generally known in the rubber compounding art, such as by mixing the various constituent materials in the amounts listed above at a temperature in a range of from about 135° C. to about 180° C. to form a green rubber. The green rubber may be further formed into a tire tread and cured on a tire (not shown) by means well known in the art. Such rubber compound provides desirable wear properties without substantially sacrificing other performance characteristic(s), e.g., traction properties.

Non-limiting examples of rubber compounds including the A-B block polymers in accordance with the description are now discussed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

EXAMPLES

A control rubber compound was prepared which included (1) 96.25 phr styrene-butadiene rubber (37.5 phr oil-extended), (2) 30 phr cis polybutadiene (3) 86 phr silica filler, (4) 13.8 phr (6.9 phr active) silane coupling agent, i.e., bis(3-triethoxysilylpropyl) tetrasulfide (also known as Si-69), (5) 3 phr antioxidants, (6) 1.5 phr wax, (7) 2.5 phr zinc oxide, (8) 3 phr stearic acid, (9) 5 phr alphamethylstyrene resin, (10) 1.7 phr sulfur, and (11) 3.7 phr accelerators. A test rubber compound was prepared based on the control compound with the exception that the oil extended SBR was replaced with SBR-polycaprolactone block polymer (See Sample 1B of Table 1).

The rubber compounds were compounded by methods generally known in the rubber compounding art by mixing the various constituent materials in the amounts listed above at a temperature in a range of from about 135° C. to about 180° C. to form a green rubber. The green rubber was subsequently cured by means well known in the art. The rubber compounds were fully characterized. Those results are summarized in Table 6 below.

TABLE 6

|  | Control | Test compound |
|---|---|---|
| INSOLUBLE POLYMER by GPC (%) | 65.8 | 74.2 |

TABLE 6-continued

| | Control | Test compound |
|---|---|---|
| PLASTICITY - MOONEY VISCOSITY (ML 4) | 57.3 | 44.6 |
| MIN.S' (DN · M) | 3.9 | 3.4 |
| AMNT.S' (DN · M) | 15.1 | 12.9 |
| T90 (MIN) | 16.6 | 21.8 |
| SHORE A | 63.5 | 61.5 |
| REBOUND VALUE 0° C. (%) | 9 | 9.6 |
| REBOUND VALUE 100° C. (%) | 62.8 | 61.2 |
| ELONGATION AT BREAK (%) | 414.4 | 412.6 |
| 100% MODULUS (MPA) | 2 | 1.7 |
| 300% MODULUS (MPA) | 12.5 | 9.7 |
| TEAR STRENGTH (N/MM) | 18.1 | 19.4 |
| AVG LOSS SPECIMENS (MM3) | 114.3 | 133.6 |
| Green RPA G' (15%; 0.83 Hz) (MPA) | 0.319 | 0.257 |
| Cured RPA G' (1% sw1) (MPA) | 2.258 | 2.146 |
| TD (10% sw1) | 0.105 | 0.116 |
| G' (1%) (MPA) | 2.029 | 1.864 |
| TD (10%) | 0.101 | 0.114 |

As determined by GPC, the percent of insoluble polymer for the test compound was 74.2% as compared to 65.8% for the control. This higher percentage indicates a stronger polymer-filler interaction for the SBR-polycaprolactone block polymer. This increase in bound rubber is due to the interaction of the hydroxy group of the polycaprolactone with the coupling agent, which in turn interacts with the filler thereby providing a greater dispersion of the filler. Accordingly, there is greater interaction between the SBR-polycaprolactone block polymer and silane coupling agent of the test compound. It is noted that the cured properties of the test compound are similar to the control. To that end, an unexpected benefit of the test compound includes a low viscosity, as compared to the control, as reflected by the Mooney viscosity (ML-4) at 100° C., MDR min. torque, and green RPA G', which suggests that the test compound is easier to process despite having a strong polymer-filler interaction.

While the present invention has been illustrated by the description of embodiments, and while the illustrative embodiments have been described in considerable detail, it is not the intention of the inventors to restrict or in any was limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the scope of the inventor's general inventive concept.

What is claimed is:

1. A rubber compound comprising:
   an anionically polymerized block polymer defined by A-B, wherein A includes at least one type of polymerized conjugated diene monomer, a polymerized vinyl aromatic monomer, or a mixture thereof and wherein B is a polylactone, which is hydroxy terminated, and wherein the anionically polymerized block polymer includes about 1 percent to about 5 percent of the polylactone;
   from about 1 phr to about 20 phr of an organosilane coupling agent wherein the organosilane coupling agent includes a bis(trialkoxysilyl) alkane, bis(trialkoxysilylalkyl) polysulfide, or mixtures thereof; and
   from about 10 phr to about 170 of silica filler,
   wherein the rubber compound is in the form of a tire tread or tire component.

2. The rubber compound of claim 1 wherein the A block is a copolymer of two different types of polymerized conjugated diene monomers.

3. The rubber compound of claim 2 wherein the two different types of polymerized conjugated diene monomers are butadiene and isoprene, the polylactone is polycaprolactone, and wherein the organosilane coupling agent is bis(trialkoxysilylalkyl) polysulfide.

4. The rubber compound of claim 1 wherein the A block is a copolymer of the at least one polymerized conjugated diene monomer and the polymerized vinyl aromatic monomer.

5. The rubber compound of claim 4 wherein the polymerized vinyl aromatic monomer is styrene and the at least one polymerized conjugated diene monomer is butadiene, the polylactone is polycaprolactone, and wherein the organosilane coupling agent is bis(trialkoxysilylalkyl) polysulfide.

6. The rubber compound of claim 1 wherein the polylactone is formed from a lactone monomer selected from the group consisting of C4, C6, or C12 lactones.

7. The rubber compound of claim 6 wherein the lactone monomer is ε-caprolactone.

8. The rubber compound of claim 1 wherein the polymerized conjugated diene monomer is selected from the formula $R^1R^2C=CR^5—CR^6=CR^3R^4$, wherein $R^1$, $R^2$, $R^3$, and $R^4$ are independently selected from the group consisting of hydrogen and $C_1$-$C_{15}$ alkyl groups, and $R^5$ and $R^6$ are independently selected from a $C_1$-$C_{15}$ alkyl group or hydrogen.

9. The rubber compound of claim 1 wherein the organosilane coupling agent is present in an amount of about 1 phr to about 12 phr and the silica filler is present in an amount of about 30 phr to about 150 phr.

10. A rubber compound comprising:
    an anionically polymerized block polymer defined by A-B, wherein A includes at least one type of polymerized conjugated diene monomer selected from the formula $R^1R^2C=CR^5—CR^6=CR^3R^4$, wherein $R^1$, $R^2$, $R^3$, and $R^4$ are independently selected from the group consisting of hydrogen and $C_1$-$C_{15}$ alkyl groups, and $R^5$ and $R^6$ are independently selected from a $C_1$-$C_{15}$ alkyl group or hydrogen, a polymerized vinyl aromatic monomer, or a mixture thereof and wherein B is polycaprolactone, which is hydroxy terminated, and wherein the anionically polymerized block polymer includes about 1 percent to about 5 percent of the polycaprolactone;
    from about 1 phr to about 20 phr of a bis(trialkoxysilyl) alkane, bis(trialkoxysilylalkyl) polysulfide, or mixtures thereof; and
    from about 10 phr to about 170 phr of silica filler,
    wherein the rubber compound is in the form of a tire tread or tire component.

11. A tire comprising:
    a tire tread including a rubber compound comprising:
        an anionically polymerized block polymer defined by A-B, wherein A includes at least one type of polymerized conjugated diene monomer, a polymerized vinyl aromatic monomer, or a mixture thereof and wherein B is a polylactone, which is hydroxy terminated, and wherein the anionically polymerized block polymer includes about 1 percent to about 5 percent of the polylactone;
        from about 1 phr to about 20 phr of an organosilane coupling agent wherein the organosilane coupling agent includes a bis(trialkoxysilyl) alkane, bis(trialkoxysilylalkyl) polysulfide, or mixtures thereof; and from about 10 phr to about 170 phr of silica filler.

12. The tire of claim 11 wherein the A block is a copolymer of two different types of polymerized conjugated diene monomers.

13. The tire of claim 12 wherein the two different types of polymerized conjugated diene monomers are butadiene and isoprene, the polylactone is polycaprolactone, and wherein the organosilane coupling agent is bis(trialkoxysilylalkyl) polysulfide.

14. The tire of claim 11 wherein the A block is a copolymer of the at least one polymerized conjugated diene monomer and the polymerized vinyl aromatic monomer.

15. The tire of claim 14 wherein the polymerized vinyl aromatic monomer is styrene and the polymerized conjugated diene monomer is butadiene, the polylactone is polycaprolactone, and wherein the organosilane coupling agent is bis (trialkoxysilylalkyl) polysulfide.

16. The tire of claim 11 wherein the polylactone is formed from a lactone monomer selected from the group consisting of C4, C6, or C12 lactones.

17. The tire of claim 16 wherein the lactone monomer is ε-caprolactone.

18. The tire of claim 11 wherein the organosilane coupling agent is present in an amount of about 1 phr to about 12 phr and the silica filler is present in an amount of about 30 phr to about 150 phr.

* * * * *

UNITED STATES PATENT AND TRADEMARK OFFICE
CERTIFICATE OF CORRECTION

| | |
|---|---|
| PATENT NO. | : 7,662,883 B2 |
| APPLICATION NO. | : 11/617342 |
| DATED | : February 16, 2010 |
| INVENTOR(S) | : Adel Farhan Halasa et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 262 days.

Column 7
Line 5, change "$CR_3\ SiR_2\ O\ [\ CH_2\ ]_n\ Li$" to -- $CR_3\text{-}SiR_2\text{-}O\text{-}[\text{-}CH_2\text{-}]_n\text{-}Li$ --.

CLAIM 1
Column 16, Line 1
Change "about 170 of silica" to -- about 170 phr of silica, --.

Signed and Sealed this

Twenty-sixth Day of October, 2010

David J. Kappos
*Director of the United States Patent and Trademark Office*